United States Patent [19]
Bruell

[11] Patent Number: 5,680,585
[45] Date of Patent: Oct. 21, 1997

[54] METHOD AND APPARATUS FOR DEFINING DATA PACKET FORMATS

[75] Inventor: Gregory O. Bruell, Carlisle, Mass.

[73] Assignee: Bay Networks, Inc., Santa Clara, Calif.

[21] Appl. No.: 414,445

[22] Filed: Mar. 31, 1995

[51] Int. Cl.⁶ .................... G06F 13/00; G06F 13/42; G06F 15/00
[52] U.S. Cl. ............... 395/500; 364/240.8; 364/260.1; 364/280.4; 364/284
[58] Field of Search .................... 395/200.18, 200.2, 395/500, 375, 800

[56] References Cited

U.S. PATENT DOCUMENTS

| | | | |
|---|---|---|---|
| 5,021,947 | 6/1991 | Campbell et al. | 395/800 |
| 5,475,838 | 12/1995 | Fehskens | 395/185.1 |
| 5,483,640 | 1/1996 | Isfeld et al. | 395/200.03 |
| 5,515,508 | 5/1996 | Pettus et al. | 395/200.01 |
| 5,524,253 | 6/1996 | Pham et al. | 395/800 |

Primary Examiner—Kevin J. Teska
Assistant Examiner—Ayni Mohamed
Attorney, Agent, or Firm—Blakely, Sokoloff, Taylor & Zafman

[57] ABSTRACT

A packet description language which is declarative in nature and suitable for efficiently and flexibly defining data packet formats in accordance with internetwork routing device uses. Data packet formats may be defined utilizing the packet description language and then compiled to create a data structure corresponding to the defined data packet format. A routing device test platform may generate test data packets and decode received test packets by referencing the test data to the compiled data structure defined in accordance with the packet description language. The declarative language provides for assigning numerous default values and attributes to packet fields such that only a small amount of data need be specified when regression testing a new routing device.

14 Claims, 4 Drawing Sheets 5,680,585

METHOD AND APPARATUS FOR DEFINING DATA PACKET FORMATS

BACKGROUND OF THE INVENTION

1. Field of the Invention

The present invention relates to the field of computer networking. More particularly, the present invention relates to a method and apparatus for defining network data packet formats for use by data network communications devices.

2. Art Background

Computer networks are implemented to exchange information from one location to another.. The information may be data exchanged between users of the computer network, or data propagated from one user to a peripheral device such as a printer or remote data storage location. In recent years, network communication systems have spread worldwide, increasing the efficiency of users' working habits by increasing the volume of information that can be exchanged almost instantaneously to one location to another. The effect has been revolutionary. Today, even personal communications and document delivery are handled via electronic mail where, in the past, other means of communicating would have been required.

The proliferation of computer networks has necessitated the development of internetworking communications devices, devices for routing data packets between separate data networks in an internetwork environment. These devices, often referred to as router or gateways, provide a mechanism for users (or nodes) of one network to communicate with users (or nodes) of another network. The role of routers or gateways is to provide a communications path between interconnected networks regardless of the protocols implemented by the various networks.

Currently, there are numerous protocols existing for defining data packet formats for propagation over an internetwork environment. Further, data packets must be propagated in accordance with a protocol defined by the medium over which they are going to be conveyed. The internetwork communication devices described above must be capable of receiving and forwarding data packets from network to network in accordance with the various media transmission protocols while, maintaining the data format in accordance with the prescribed data packet format. Accordingly, it is essential that routers thoroughly be tested during development to ensure their compatibility with existing packet protocols and adaptability for handling future packet protocols.

During the manufacture and development of internetwork routers, the testing phase is extremely important. Routers ideally should be regression tested to cover every kind of packet format for every type of medium protocol. Heretofore it has been necessary to develop test platforms using computer languages which procedurally define each type of test packet to be propagated through the router or router simulator for regression testing. If an additional data packet format or medium protocol needed to be tested over the router, it was necessary to develop new procedural programs for defining and generating the packets to be tested. Similarly, separate procedural routines had to be developed for decoding test packets to test a router's reception capability. It would advantageous, and is therefore an object of the present invention to provide a mechanism for simply representing packet formats in a declarative manner such that packet generation and packet decoding may be efficiently accomplished for testing routing devices over a plurality of defined packet protocols.

SUMMARY OF THE INVENTION

According to one aspect of the present invention, a descriptive language is provided for defining data packet formats. The packet description language is declarative in nature and designed for efficiently and flexibly representing data packet formats. The packet description language provides facilities for describing sequences of bits with both fixed and variable length fields. It also includes syntax for encoding the semantics of packet data including intra-packet relationships between fields. A data packet format file defined utilizing the packet description language may be compiled and then used by application programs. Application programs may both encode data into packets according to the defined format as well as decode packets that were assembled according to the protocol. To do this, application programs need only reference a data structure resulting from the compiled packet description language file. In this manner, numerous data packets formats may be defined in accordance with different data transfer media and packet protocols.

A test platform may be developed for testing new internetwork routing devices which utilizes the packet description language of the present invention. A data packet format to be tested over a router under test may be defined in the packet description language in accordance with a desired packet format protocol and then compiled by a packet description language compiler. A compilation of the defined packet format will generate a data structure which may be referenced by multiple testing programs. A program for sending test packets over a device under test will reference the data structure and construct data packets accordingly. Similarly, when the device under test is being tested for its ability to send packets, a received packet may be decoded by reference to the same compiled data structure.

In accordance with other aspects of the present invention, the packet definition language used for defining packet formats may be provided with specific default values for portions of a data packet and attributes corresponding to various fields. When using the data structure created by the compiled packet format file for testing, only desired fields need to be specified in defining test inputs to the device under test. The rest of the fields will acquire their defined default values. Similarly, output attributes such as display formats may be defined in the packet description. When the device under test is being tested for transmitting and encoding packets, they will automatically be displayed in a correct format.

An additional aspect of the present invention takes advantage of the simple decode mechanism provided by the packet description resource. By having a packet format definition file compiled and a data structure defined, incoming data packets may be rapidly decoded and examined for various purposes. Once such purpose includes using the defined packet resource for a packet filtering mechanism.

BRIEF DESCRIPTION OF THE DRAWINGS

The objects, features and advantages of the present invention will be apparent from the following detailed description in which.

DETAILED DESCRIPTION

The present invention provides a method and apparatus for defining data packet structures in a declarative manner. In the following detailed description, specific details are set forth such as, particular data packet formats and media access types, in order to provide a thorough understanding of the present invention. It will be appreciated, however, by one skilled in the art that the teachings of the present invention may be practiced without such specific details. In other instances, well-known structures and devices are shown in block diagram form in order not to obscure the present invention.

Figure 1:
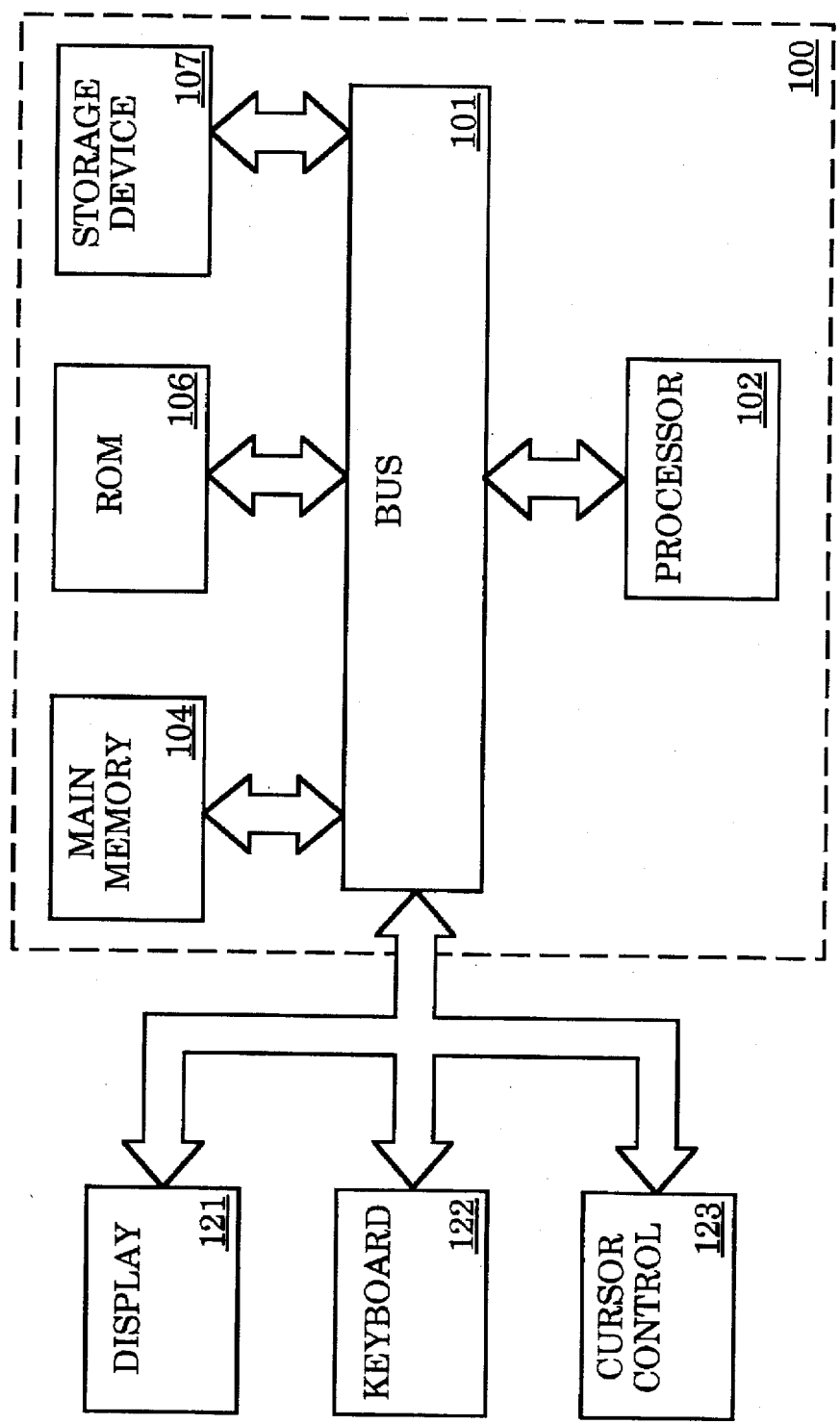
FIG. 1 illustrates a block diagram of a computer architecture upon which an embodiment of the present invention may be implemented.

Referring first to FIG. 1, there is shown a computer system or work station 100 upon which an embodiment of the present invention may be implemented. Computer system 100 comprises a bus or other communication means 101 for communicating information between elements of the computer system 100. This is a processing unit or a processing block 102 coupled to communicate with the bus 101 for processing computer instructions and data. The computer system 100 further comprises a main memory of random access memory (RAM) or other dynamic storage device 104 coupled to the bus 101 for storing data and instructions to be executed by the processing block 102. The main memory 104 may also be used for storing temporary variables or other intermediate information during execution of computer instructions by the processing block 102. Computer system 100 also includes a read only memory (ROM) 106 coupled to the bus 101 for storing static information and various instructions for the processing block 102. There is also a mass storage device 107 coupled to the bus 101 for long term storage of other information and computer instructions. The data storage device 107 may comprise a magnetic disk or optical disk drive or other long term storage device.

The computer system 100 as illustrated in FIG. 1 is also coupled via the bus 101 to a number of input/output (I/O) devices. These devices may include a display device 121, such as a cathode ray tube (CRT), for displaying computer output to a computer user. Alphanumeric input device 122, including alphanumeric and other keys is typically coupled to the bus 101 for communicating information and command selections from a computer user to the processing block 102. An additional type of user input device is a cursor control device 123, such as a mouse or a trackball for communicating direction information and command selections to the processor block 102 and for controlling cursor movements on the display 121.

In accordance with the present invention, the computer system 100 is used to simplify the process of defining data packet formats which correspond to the physical packets of information that may be propagated over an internetwork environment. The processor block 102 executes instructions which allow a system user to input a packet format definition file in accordance with a declarative language syntax to be described below. The processor block 102 then executes a compiler program which translates the data packet format definition as entered by the computer user into a data structure which may be referenced by other programs. For example, as will be described below, a new routing device may be tested by using a test platform running on the computer system 100. The computer system 100 will generate test packets for sending and receiving to a device under test (or a simulator) by referring to the data structure for the purpose of either generating or decoding the desired test data packet. In accordance with one implementation of the present invention, a user need only specifies a test script and define a data packet format in a packet description file to test a device under test.

The present invention describes a packet description language (PDL) which is a declarative language tailored for defining data packet formats including the rules that describe how different fields in the packet format are related. The declarative language provides facilities for describing sequences of bits with both fixed and variable lengths of fields. It also includes syntax for encoding the semantics of packet data including intra-packet relationships between fields. The declarative nature of the language allows for the decoupling of packet syntax from usage. From a single representation, many different sorts of functionality are possible including encoding, decoding and verification, and filter specification. This provides numerous advantages over procedural descriptions of the same data in terms of maintainability, reuse and portability.

A packet description file created in accordance with the packet description language may be compiled by a packet description compiler that generates a packet format data structure. A packet processing application may then reference the packet format data structure for either generating data packets or decoding data packets sent to it with reference to the defined packet description. In one embodiment of the present invention, the packet processor can work with other tools to produce a complete test environment such as the one to be described below. The packet processor provides a set of primitives accessible to the other elements of a test platform for sending, decoding, and displaying data packets.

Figure 2A:
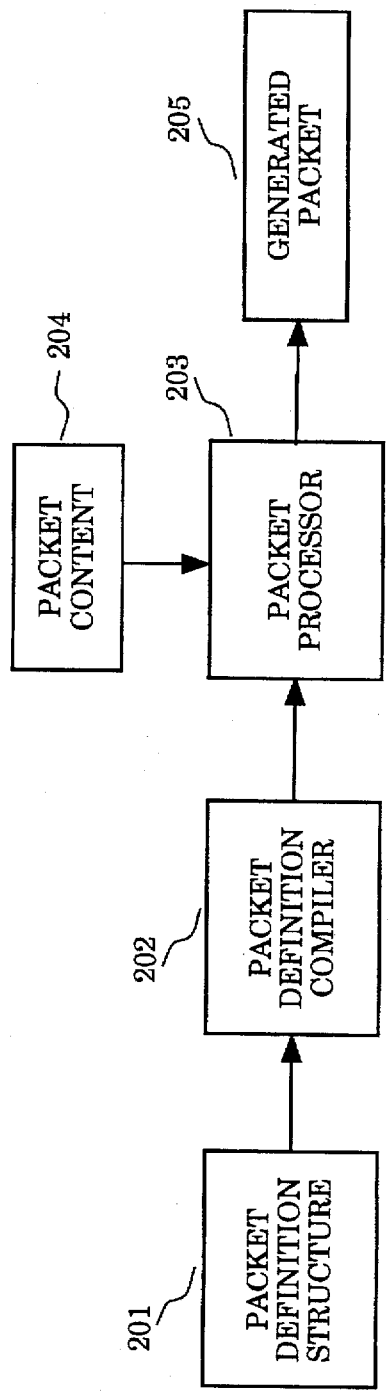
FIGS. 2(a) and 2(b) illustrate block diagrams of the present invention utilized for data packet generation and data packet decoding.
Figure 2B:
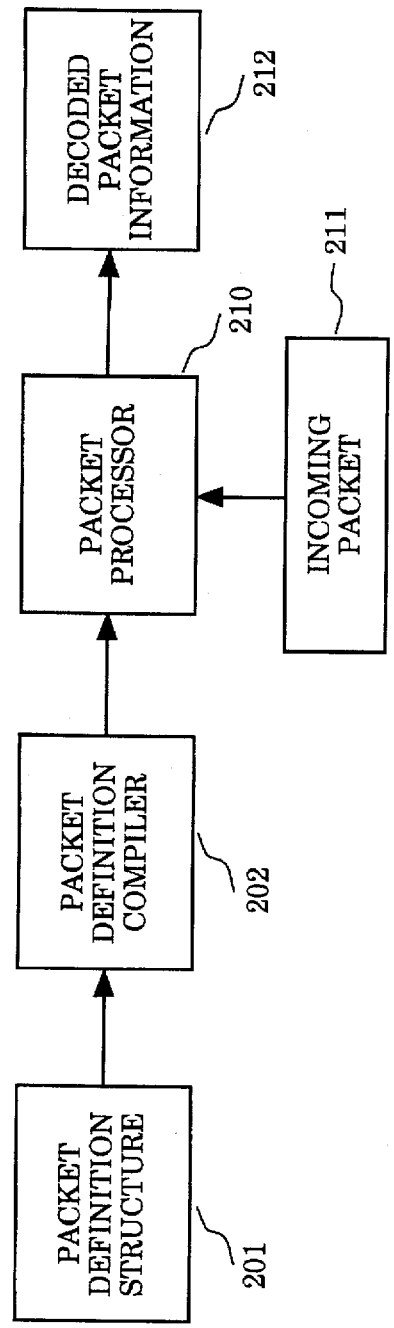

FIGS. 2(a) and 2(b) illustrate two basic architectures for utilizing the packet description language of the present invention. In FIG. 2(a) a packet definition structure 201 for a desired packet format is defined in accordance with the packet description language. The packet definition structure 201 is compiled by a packet definition compiler 202 which generates a data structure for reference by a packet processor 203. The packet processor 203 receives the information identified as packet content 204 with desired information to be included in a generated packet. The packet processor 203 generates a packet 205 in accordance with the defined packet format detailed in the packet definition structure 201 incorporating any defined default information not superseded by the packet content defined at 204. The output of packet processor 203 is the generated packet 205 in the defined packet format.

FIG. 2(b) illustrates the usefulness of the packet definition language of the present invention for decoding packets received in accordance with a defined packet format. In FIG. 2(b), the same packet definition structure 201 is provided to the packet definition compiler 202. In this figure, the packet processor 210 makes reference to the data structures defined by the packet definition compiler 202 for decoding an incoming data packet 211. Packet processor 210 may be the same physical processing element as packet processor 203 from FIG. 2(a) operating in a decode mode. The packet processor 210 decodes the incoming data packet 211 resulting in decoded packet information 212 which may be provided to a display device for evaluation by a user.

The packet definition language (PDL) provided by the present invention satisfies the need for a simple mechanism for defined packet generation and decode. It provides a concise form of packet format representation far advantageous to previous mechanisms available. For example, if one wished to use the C programing language for packet definition, it would be necessary to resort to procedural routines for packet construction and separate procedural routines for packet decode. C is not a declarative language to the extent necessary for defining the formats for packet content including rules that describe how different fields in the packet are related. The packet description language of the present invention provides a central description for packet representation which may be referred to by other applications. For example, from one packet description, it is possible to create functionality for packet decoding, packet encoding, packet display and packet value verification.

The packet description language of the present invention is designed to be specially suitable for communications related programming. While there exist other declarative languages, such as ASN.1, these tend to be general declarative languages and require lengthy amounts of code even for simple descriptions. The present invention provides a mechanism for implementing a central file with a minimal number of lines of code required for completely defining even complex data packet representations. It provides a convenient mechanism for quickly modifying packet format definitions and creating new packet format definitions. This is especially suitable for testing of communication devices over a wide range of data type protocols.

Syntax for Packet Description Language

The following portion of this detailed description is an explicit description of the syntax for defining data packet formats using the packet description language (PDL). There are two basic elements in PDL: fragments and sequences. A fragment is similar to a construct in C in that it is an ordered set of fields. Fragments may also have attributes. Each fragment field has a name, a width and optionally, some attributes. The width of a field is described as an expression that signifies a number of bits.

```
fragment X {
    fieldY : 32;
    fieldZ : 8;
    fieldW : 3 : attributeA, attributesB;
}   fragattributeA;
```

In this example, fieldY is 32 bits long, fieldZ is 8 bits long and fieldW is 3 bits long. Expressions may be more complex. For instance, to describe a Pascal string which is a 1 byte length followed by length number of bytes of string one could write:

```
fragment pascal_string {
    length : 8;
    string : length * 8;
};
```

There are three types of fields: simple, array and child. Each of the above examples included only simple fields. The array type of field is used to repeat a piece of structured data described in a separate fragment. The following example describes a list of 10 Pascal strings:

```
fragment list_of_pstrings {
    pascal_string[10] : 0;
};
```

Note the width field is zero. This has significance and will be described in detail in the array section below.

Fields may also be of type child. A child field is similar to a switch statement in C. Child statements provide a way to specify the relationship between fragments. The following example uses a child statement to tie two fragments together:

```
fragment header {
    type : 8;
    length : 8;
    child(type) : length * 8 : {
        trailer1(1),
        trailer2(2)
    };
};
```

The header fragment is followed by trailer1 if type is equal to 1 or trailer2 if type is equal to 2. The child field has a width which delimits the total amount of space that the children fields may occupy.

Child statements may also use expressions to describe fragment ordering. Suppose that trailer1 follows header if the type is 1 or the length is less than 100.

```
fragment header {
    type : 8;
    length : 8;
    child(type) : length * 8 : {
        trailer1(type == 1 || length < 100),
        trailer2(2)
    };
};
```

The order in which the children are listed is meaningful especially in the previous example where the expression for trailer1 might be true at the same time that the expression for trailer2 might be true. The expressions are evaluated in order from the top of the list to the end until an expression evaluates to non-zero.

The above features are the primary features needed for describing the semantics of data packet formats. Below is an example of an IP header and an FDDI header:

```
fragment IP_HDR {
    ip_ver              : 4;
    ip_ihl              : 4;
    ip_tos              : 8;
    ip_total_length     : 16;
    ip_id               : 16;
    ip_flags            : 3;
    ip_frag_offset      : 13;
    ip_ttl              : 8;
    ip_protocol         : 8;
    ip_xsum             : 16;
    ip_srcaddress       : 32;
    ip_dest_address     : 32;
    IP_OPTION_TUPLE[]   : (ip_ihl - 5) * 32;
```

```
    child(ip_protocol)        : (ip_total_length - (ip_ihl * 4)) * 8 : {
        ICMP_HDR(1),
        IGMP_HDR(2),
        ...
    };
};
fragment FDDI_HDR {
    class_of_service          : 1;
    address_length            : 1;
    frame_format              : 2;
    control_bits              : 4;
    dst                       : 16 + (address_length * 32);
    src                       : 16 + (address_length * 32);
    child(frame_format) : 0 : {
        VOID_FRAME((class_of_service == 0) &&
                    (frame_format == 0) && (control_bits == 0)),
        NONRESTRICTED_TOKEN((class_of_service == 1) &&
(address_length == 0) && (frame_format == 0) && (control_bits ==
0)),
        RESTRICTED_TOKEN((class_of_service == 1) && (address_length ==
1) && (frame_format == 0) && (control_bits == 0)),
        SMT_HDR((class_of_service == 0) && (frame_format == 0) &&
(control_bits > 0)),
        LLC_HDR((class_of_service == 1) && (frame_format == 0) &&
(control_bits > 0)),
        LLC(1),
        RESERVED(default)
    };
};
```

Width Expressions

Operators

The following operators are available for use in width expressions: && | | == != < > & | + − * / % ( ) ! Each of these operators has the same meaning and precedence as in C.

Built-in Functions

There are three built-in functions that can be used for field widths: pdulength, fragoffset, and curoffset. These are used to specify widths that are neither fixed nor functions of internal packet data. For example, ZIP Queries in Appletalk include a header followed by enough ZIP Tuples to fill the rest of the packet.

```
fragment ZIP_QUERY {
    net_count : 8 : display = "%dec";
    ZIP_QUERY_TUPLE[ ] : pdulength[ ] - curoffset[ ] ;
};
```

The pdulength function returns the total number of bytes in a packet. The fragoffset returns the offset in bytes to the beginning of the current fragment. The curoffset function returns the number of bytes from the beginning of the packet to the current field. In the ZIP example the expression pdulength( )—curoffset( ) would return the number of bytes from the beginning of the first ZIP_QUERY_TUPLE array element to the end of packet.

Because the expressions have a rich set of operators available it is possible to describe complicated encodings. For instance, if a protocol has an 8 bit field that holds a length, where the high order bit is reserved as an extension bit that signifies that the remaining 7 bits should be treated as the length (in bytes) of a new field following the length field. This is expressed as:

```
fragment SNMP_HDR {
    type                      : 8;
    ext                       : 1;
    len                       : 7;
    realLen                   : ext * len * 8;
    ...
};
```

In this example if the extended bit is 0 then the expression ext * len * 8 evaluates to 0 and the realLen field is 0 bits wide. If the extended bit is set then the expression will evaluate such that realLen is len number of bytes wide.

External References

The following example is from the DVMRP protocol that is a particularly complicated width encoding. The objective is that the width of dvmrp_net is determined by how many bits of the DVMRP_REPORT_TUPLE.dvmrp_report_mask are set.

```
fragment DVMRP_NET_TUPLE {
    dvmrp_net : 8 * (4 - ( (!DVMRP_REPORT_TUPLE.dvmrp_report_mask)
    + (! (DVMRP_REPORT_TUPLE.dvmrp_report_mask & 0x00FFFF) ) +
    (! (DVMRP_REPORT_TUPLE.dvmrp_report_mask & 0x0000FF) ) ) ) ;
```

```
    dvmrp_metric_eol : 1 : default=0;
    dvmrp_metric : 7 : legal_values=(1-63), display="%dec";
};
```

In this example the width expression refers to a field in another fragment. If there are two fragments X and Y, and X is a child of Y then X can refer to a field in its parent Y.

```
fragment X {
    fielda : 8 * Y.field2;
    child(Y.field1) : 0 : {
        ...
    };
};
fragment Y {
    field1 : 8;
    field2 : 8;
    child(field1) : 0 : {
        X(1)
    };
};
```

The order of definition in this case does not matter. This feature can be useful for cases in which protocol designers stray from the path of "protocol purity" and sneak a peek at data found in previous headers. It is not recommended that the child fragment have multiple parents because then the value of the reference is indeterminate. For the same reason it is also not recommended that the reference be made for any other fragment relationships besides that or direct child-parent.

Child Statements

Child statements may appear anywhere within a fragment but only one may be used. If the child statement is the list field in the fragment then the behavior is different. If the child is embedded then the data of all the ancestors will be contained within the node with the embedded child. If the child is at the end then the children are not "part of" the parent node. This is important to understand when calculating widths.

```
fragment frag0 {
    fldx : 8;
    child(fld1) : 0 : { .
        frag0(1)
    };
};
```

In this example if we take the length of frag1 then it will include the lengths of all the ancestors. If the child statement had been at the end then the length of frag1 would only include the sum of all widths in frag1. If fld1 is 1 then the length of frag1 would be 24 bits but if the child statement was at then end then no matter what the value of fld1 is the length of frag1 would be 16 bits. Just as in width expressions the child expressions provide flexibility for defining data packet formats. For instance, it is possible to express ranges of values for a child demultiplexing value.

```
child(x) : 0 : {
    SNMP_NORMAL_PDU(snmp_pdu_tag > 0x9f && snmp_pdu_tag < 0xa4)
};
```

Could also be written as:

```
child(x) : 0 : {
    SNMP_NORMAL_PDU(snmp_pdu_tag == 0xa0 ||
                    snmp_pdu_tag == 0xa1 ||
                    snmp_pdu_tag == 0xa2 ||
                    snmp_pdu_tag == 0xa3)
};
```

As in switch statements it is possible to specify a default child if there are no other matches. This is done using the default keyword.

```
fragment FRG {
    f1 : 8;
    child(f1) : 0 : {
        C1(1),
        C2(default)
    };
};
```

In this case if f1 is 1 then the child is C1. For all other values of f1 the child is C2.

There are certain cases where a protocol designer misinterpreted the meaning of a field requiring that the decoding of a packet be redone based on the value of some field. For instance one of the possible encapsulations of IPX requires that the Ethernet type be re-evaluated as part of the IPX frame. This sort of decoding is accomplished in PDL using the offset field of a child statement. The offset field is an optional argument to a child demux case.

```
dsap : 8;
ssap : 8;
ctrl : 8;
child(dsap) : 0 : {
    SNAP_HDR(dsap == 0xaa && ssap == 0xaa && ctrl == 3),
    IPX_HDR(dsap == 0xe0 && ssap == 0xe0 && ctrl == 3),
    IPX_HDR(dsap == 0xff && ssap == 0xff, -24)
};
```

If the dsap and ssap are all ones then the decoding should backup and resume with the IPX header. Note here that a fragment may appear twice in child statement.

Arrays

There are four mechanisms for delimiting the width of an array. First, an array can be unbounded in which case it will continue to repeat until the end of the PDU. This is accomplished by using a zero width and leaving the array brackets ([ ]) empty.

```
fragment REPEAT {
    length : 8;
    second : length * 8;
};
fragment TOEND {
    REPEAT[ ]: 0;
};
```

Secondly, a width expression can be used as in the following example:

```
fragment FIXEDWIDTH {
    REPEAT[ ] : 100;
};
```

Here the REPEAT fragment will repeat as many times as it can before 100 bits are consumed. Third, an array can be given a count which can be either a field name or a number as in:

```
fragment COUNT {
    count : 8;
    REPEAT[count] : 0;
};
```

The repeat fragment will repeat exactly count times. Note that the width can be specified as 0 in this case. Lastly, an array can conditionally terminate based on the value of some field in the arrayed fragment.

```
fragment CONDITIONAL {
    REPEAT[REPEAT.length == 0] : 0;
};
```

The array will keep repeating until the length field of one of the elements array fragment is 0. The comparison and count features can be used in conjunction with a specified width. The width has a higher precedence than the other two mechanisms but if it is 0 then the width is not used.

Field Attributes

Field attributes can be used to specify several aspects of the semantics of fields. There are four major categories of field attributes: encoding, value verification, display and tags. The keyword 'default' is used to signify the default value of a field when a packet is being encoded. Verification is accomplished using the 'legal_values' keyword which can including discontigous ranges of values. Lastly, the 'display' keyword can be used to give a more complete name to a field. It is also possible for tags to be assigned to fields with any user defined semantics.

Default value expressions may include two built-in functions for calculating lengths and checksums. Below is the IP_HDR example with several field attributes filled in. Note that the PDL files are run through a C macro pre-processor and therefore in this example IP_VERSION, IP_TOS and IP_PROTOCOL are actually a list of values (for instance IP_VERSION is a macro that expands to be "IP=4, ST_DGRAM=5, SIMPLE_INTERNET_PROTOCOL=6, TP IX NEXT_INTERNET=7, PIP=8").

```
fragment IP_HDR {
    ip_ver          : 4 : legal_values=(IP_VERSION),
                          default=4, display="Version %dec";
    ip_ihl          : 4 : default = length(node, node) / 4,
                          display="Header Length %dec nibbles";
    ip_tos          : 8 : legal_values=(IP_TOS),
                          display,="Type of Service";
    ip_total_length : 16 : default = length(node, pdu),
                          display = "Total Length %dec bytes";
    ip_id           : default = 0x508,
                          display="Identification %dec";
    ip_flags        : 3 : display="Flags";
    ip_frag_offset  : 13 : display="Fragment Offset %dec
                          bytes";
    ip_ttl          : 8 : default = 0x1e, display="Time To
                          Live %dec seconds/hops";
    ip_protocol     : 8 : legal_values = (IP_PROTOCOL),
                          display="Protocol";
    ip_xsum         : 16 : default = checksum(dod, node,
                          node), display="Checksum";
    ip_src_address  : 32 : legal_values = (1-0xffffffff),
                          display="Source Address %ipa",
                          tags=(SRC_ADDRESS);
    ip_dest_address : 32 : legal_values = (0-0xffffffff),
                          default=0xFFFFFFFF, display="Destination
                          Address %ipa", tags=(DST_ADDRESS);
    IP_OPTION_TUPLE[ ] : (ip_ihl - 5) * 32;
    child(ip_protocol) : (ip_total_length -(ip_ihl * 4)) * 8 :
                          {
        ICMP_HDR(1),
        IGMP_HDR(2),
        ...
    };
} display="IP HEADER (Internet Protocol)",
        tags=(NETWORK_LAYER);
```

The default expressions may use all operators that are available in width expressions and the semantics of the operators are the same as well. The legal_value list may include not only lists of legal values but for each value a symbolic name may be assigned as in IP=4. A symbolic name may also be attached to a range such as UNASSIGNED=1–3. The legal value list may include discontigous ranges such as UNASSIGNED=1–3, ASSIGNED=10–20. Symbolic names have scope only for a single field in a fragment so the same names may be used in different fields in the same fragment or in different fragments.

Tags are a mechanism for classifying fields and fragments by aggregation. They act simply as a label which can be used to denote some semantic quality of a fragment or field. The currently defined tags are: SRC_ADDRESS, DST_ADDRESS, LINK_LAYER, NETWORK_LAYER, TRANSPORT_LAYER, SESSION_LAYER, APPLICATION_LAYER and BITSWAPPED.

PDL Usage

Filtering

PDL provides the basis for a powerful filter specification language because all packet formats can be symbolically referenced. The PDL Filter Specification Language uses PDL to provide a rich and expressive language for specifying filters. PDL-FSL filters are specified as lists of fragments and field/value tuples. The following filter specifies any ICMP_ECHO packets between two IP hosts:

```
"IP_HDR ip_src_address = (192.32.1150.67 | 192.32.150.87)
    ip_dest_address = (192.32.150.67 | 192.32.150.87),
ICMP_ECHO"
```

Note that this filter has several important features:
1) media independence
2) header length independence
3) conciseness With PDL-FSL it is possible to refer to specific fields no matter where they might appear within a packet. It is also possible to specify strict filters with fixed encapsulations.

PDL-FSL Syntax

A filter is a list of one or more PDF names, separated by comas and or operators, such as:

```
"IP_HDR"
"SNAP_HDR, RTMP_DATA_HDR, RTMP_TUPLE_HEAD, RTMP_TUPLE_LONG,
RTMP_TUPLE_LONG, RTMP_TUPLE_HEAD"
"IP_HDR || IPX_HDR"
```

Comas denote AND of values and "| |" denotes the OR operator. Each PDF name accepts one or more modifiers after the name and before the coma. For example:

```
"ARP_HDR ar_op = REQ ar_sha =
   0x000011112200 ar_spa=1.1.1.2
ar_tha = ff:ff:ff:ff:ff:ff ar_tpa=1.1.1.1"
```

Modifiers are of the form:

field operator expression where field is the name of a fragment field, operator is one of (= != = < >) and expression is either a value or an expression. Values can be number, constants, or symbolic constants.

Numbers can be decimal, hex, dotted decimal or colon notation format. Hex numbers can be any width. Constants are alpha numeric values, with no spaces in them. Symbolic constants are constants that represent legal values for this field, as specified in the PDL. In the above sample 'REQ' is one such constant.

An or expression is a list of values enclosed in parenthesis, separated by the single bar. The enclosed values must all be of the same length. That is if you have two hex numbers, they must have the same number of digits. Decimal constants are always 32 bits, and are always the same length.

To create a filter that allowed all IP traffic from 2 hosts could be done with:

```
IP_HDR ip_src_address=(1.1.1.2|1.1.1.3)
```

To expand the range to include all hosts in the last octet would be:

```
IP_HDR ip_src_address>1.1.1.0 ip_src_address<1.1.1.255
```

To exclude a single host from the above filter the following:

```
IP_FDR ip_src_address > 1.1.1.0 ip_src_address < 1.1.1.255
    ip_src_address != 1.1.1.200
```

To continue to tighten the filter, add UDP port ranges:

```
IP_HDR ip_sr_address > 1.1.1.0 ip_src_address < 1.1.1.255
    ip_src_address != 1.1.1.200,
UDP_HDR udp_src_port != RIP udp_src_port < 1001
    udp_dest_port != RIP udp_dest_port < 1001
```

This filter will work for any media and will also still work if there are IP options between the IP HDR fragment and the UDP_HDR.

The fact that the filter specifications are based on PDL allows for filter verification. For instance, it is possible to notify the filter writer that there are no encapsulations of XNS over Appletalk. It is also possible to do filter algebra as part of validation to call out errors such as "IP_HDR ip_src_address=1.1.1.1 ip_src_address !=2.2.2.2" where the first equality shadows the second inequality.

Attached as Appendix A are several complete PDL descriptions of standard data packet formats. Appendix B defines a grammar for the packet description language in accordance with one embodiment of the present invention.

A Test Platform Utilizing Packet Description Files

Figure 3:
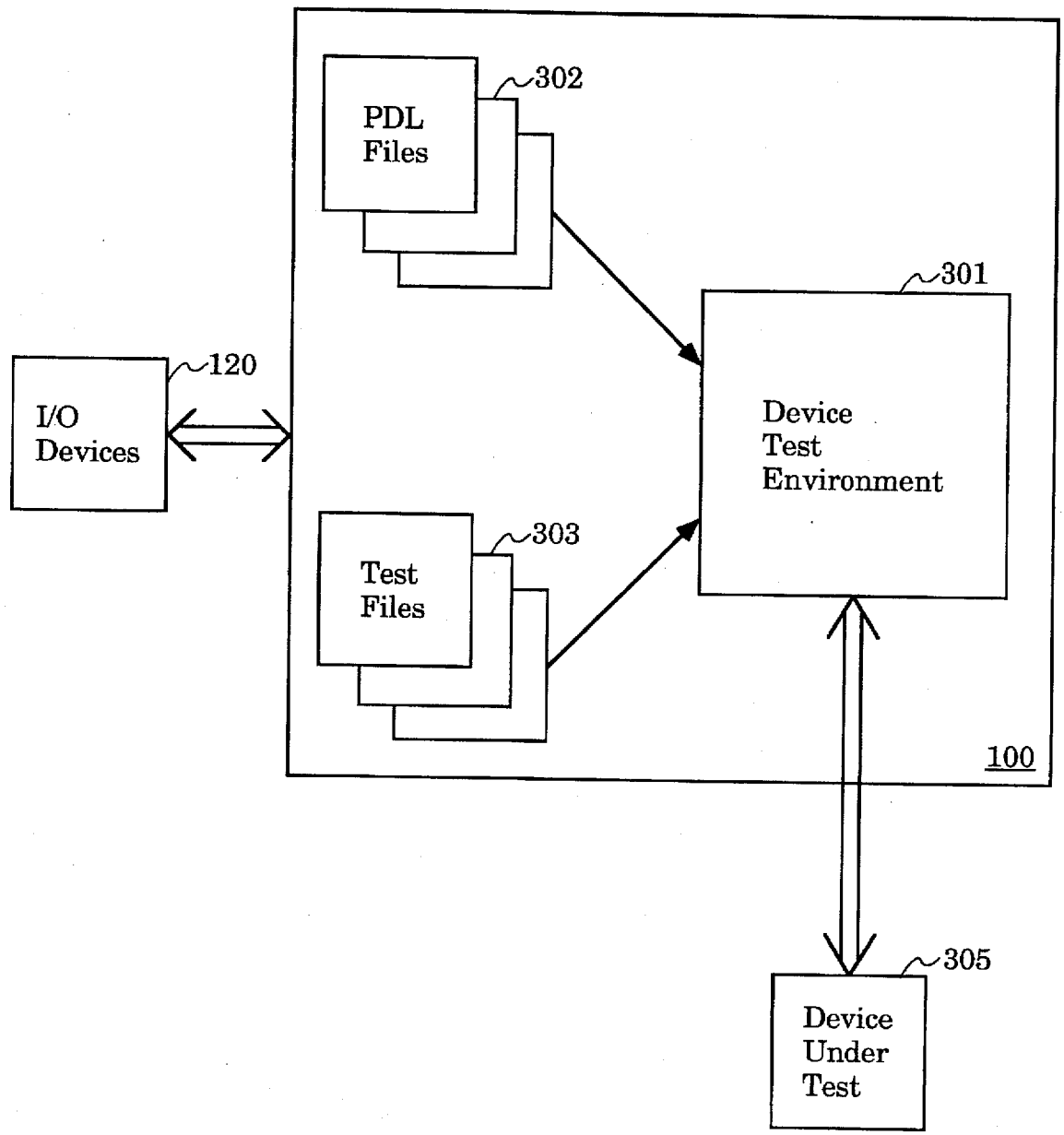
FIG. 3 illustrates a computer system incorporating a test platform architecture for an application implementing the packet description mechanism of the present invention.

The following describes how the packet description language (PDL) described above may be advantageously implemented in a system for testing internetwork routing devices. FIG. 3 illustrates a general computer environment for a test system in accordance with one embodiment of the present invention. The device test environment 301 is implemented in the computer 100 such as the one described above. To use the device test environment 301, a user defines one or several PDL files 302. The PDL files are the defined packet formats in the packet description language syntax described in the preceding section. As an alternative to having a user newly define PDL files 302, a library of such files for commonly used data packet formats may be maintained on the computer 100.

To utilize the device test environment 301, a user creates a test file 303 by, for example, using the I/O devices 120. A test file specifies the number, type and optional content of packets for the device test environment 301 to send to and receive from a device under test 305. Note that the device under test 305 may be a physical apparatus such as a network router being regression tested over numerous packet format types, or it may be a simulator for a router to be developed. The device test environment 301 follows the script created by the test files with reference to the data packet formats defined in the PDL files. The PDL files determine the structure and default content of each packet type. When a device test environment 301 reads an instruction in a test file for the device under test to send a type of packet, it assembles the test packet by referring to the packet assembly specification in the PDL files 302. For example, if the device test environment reads a test file instruction to send an Ethernet header (ENET_HDR) packet, it looks for the ENET_HDR specification in the PDL files and assembles the packet accordingly. Similarly, when the device test environment reads an instruction in a test file for the device under test to receive a type of packet, a test packet is provided for the device to receive. If the packet the test environment reads matches the packet type in the PDL files, then the device test environment 301 reports that the test succeeded; otherwise, it reports that it failed.

Figure 4:
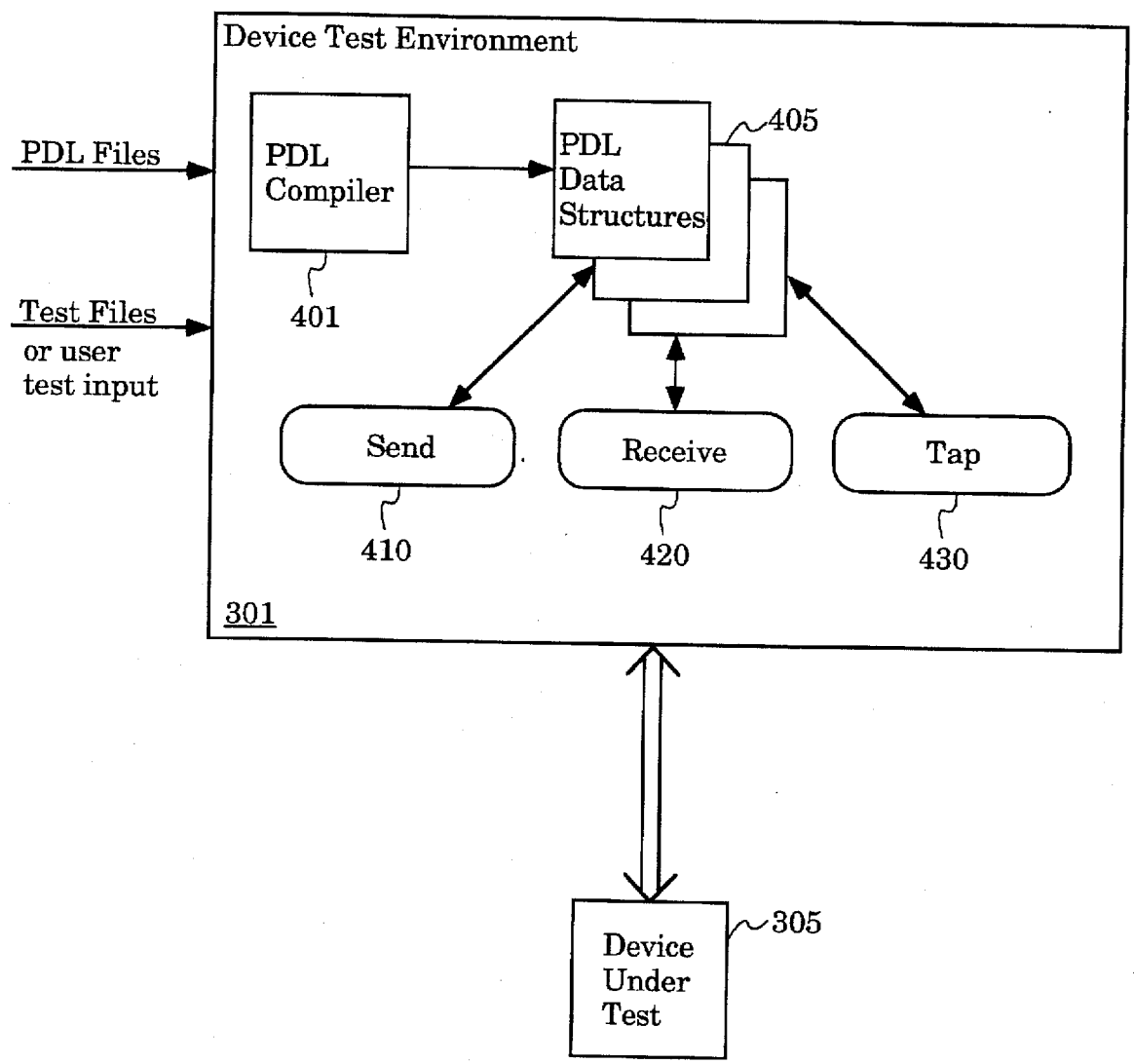
FIG. 4 illustrates a more detailed application architecture for utilizing the data packet format mechanism of the present invention in testing network communication devices.

FIG. 4 illustrates a more detailed view of the device test environment 301 in accordance with one embodiment of the present invention. The device test environment 301 is coupled to receive the input of the PDL files as well as the test files. It is noted that with reference to FIG. 4, as an alternative to test files, a user interface may be developed in which a system user may sequentially supply test commands to the device test environment 301 for serial execution.

The device test environment 301 first processes the PDL files with a PDL compiler 401. The PDL compiler 401 is a compiler constructed in accordance with the declarative structure of the PDL language for generating PDL data structures 405 which may be referenced by the test application routines of the device test environment 301. The test application routines may include a send routine 410, a receive routine 420 and a tap routine 430. The test application routines each refer to the PDL data structures 405 for carrying out their respective functions with respect to the device under test 305. For example, the send routine 410 will be provided with information for a test packet to be propagated by the device under test. The send routine 410 will take the user's supplied test data and make reference to the PDL data structure 405 to construct an appropriate packet to be propagated by the device under test 305. Similarly, the receive routine 420 will make reference to the PDL data structures 405 and data provided by a user from a test input or test file and construct a packet to be received by the device under test 305 in an appropriate data packet format. The tap function 430 is a function which will test whether or not a device under test is capable of encoding a packet in a specified data format.

The constituents of the PDL compiler and the data structures may vary. Those of ordinary skill in the computer science arts understanding compiler theory will recognize that given the description and necessities of the packet description language, the parameters for a compiler and the mechanisms for interfacing with the resulting data structures will be readily apparent.

Alternative Uses for the Packet Descriptions of the Present Invention

The suitability of the packet description language of the present invention is not limited to applications such as the test system described above. The packet description language may be implemented for defining information needed for effective filtering and security implementations for routing technologies. Other uses of the packet description language are numerous. For example, the packet description language may be used to provide a description of in-memory data structures for use in debugging programs. It may also be used for the description of internal message formats, for instance, those formats used by a router. The packet description language may also be used to describe data formats of outmoded storage media or outmoded file formats as a means for preserving the ability to read those formats. The PDL language combined with a packet processing engine may also be used as an RMON agent for counting packets and collecting statistics and storing packets based on user defined filters.

There has thus been described a method and apparatus for defining data packet formats in a concise declarative manner greatly advantageous over prior art methods. Although the present invention has been described in detail with respect to particular packet data format types and applications thereof, it will appreciated by those of ordinary skill in the art that numerous alternative applications may take advantage of the present invention. Accordingly, the scope of the present invention should be measure by the claims which follow.

APPENDIX A

```
IP_HDR {
  ip_ver dec : 4 : !4;
  ip_ihl dec : 4 : length(div4, node, node);
  ip_tos : 8 : !0;
  ip_total_length dec : 16 : length(nil, node, pdu);
  ip_id : 16 : !0x508;
  ip_flags : 3 : !0;
  ip_frag_offset : 13;
  ip_ttl : 8 : !0x1e;
  ip_protocol : 8;
  ip_xsum : 16 : checksum(dod, node, node);
  ip_src_address ip : 32 : 1-0xffffffff;
  ip_dest_address ip : 32 : 0-0xffffffff, !0xFFFFFFFF;
  IP_OPTION_TUPLE[] : (ip_ihl - 5) * 32;
  child(ip_protocol) : (ip_total_length - (ip_ihl * 4)) * 8 : {
    ICMP_HDR(1),
    IGMP_HDR(2),
    GGP_HDR(3),
    IP_HDR(4),
    ST_HDR(5),
    TCP_HDR(6),
    EGP_HDR(8),
    IGP_HDR(9),
    PUP_HDR(12),
    UDP_HDR(17),
    IDP_HDR(22),
    RDP_HDR(27),
    OSPF_HDR(89)
  };
};

IP_OPTION_TUPLE {
  option_copy : 1 : !1;
  option_class : 2 : !0;
  option_type : 5;
  child(option_type) : 0 : {
    OPT_END(0),
    OPT_NOP(1),
    OPT_BSEC(2),
    OPT_LSSR(3),
    OPT_ITS(4),
    OPT_RR(7),
    OPT_SID(8),
    OPT_SSR(9),
    OPT_GEN(11),
    OPT_MTU(12)
  };
};

OPT_GEN {
  option_length : 8;
  gen_ptr : 8;
};

OPT_BSEC {
  option_length : 8;
  bsec_level : 8 : UNCLASSIFIED=0xAB, CONFIDENTIAL=0x96, SECRET=0x5A, TOP_SECRET
  BSEC_AUTH_TUPLE[] : (option_length - 3) * 8;
};
```

A-1

```
BSEC_AUTH_TUPLE {
   flag0 : 1;
   flag1 : 1;
   flag2 : 1;
   flag3 : 1;
   flag4 : 1;
   flag5 : 1;
   flag6 : 1;
   contflag : 1;
};

OPT_SSR {
   option_length dec : 8;
   ssr_ptr : 8;
   R_ROUTE_TUPLE[] : (option_length - 3) * 8;
};

OPT_LSSR {
   option_length dec : 8;
   lssr_ptr : 8;
   R_ROUTE_TUPLE[] : (option_length - 3) * 8;
};

OPT_RR {
   option_length dec : 8;
   rr_ptr : 8;
   R_ROUTE_TUPLE[] : (option_length - 3) * 8;
};

R_ROUTE_TUPLE {
   r_address ip: 32 : 0x0-0xFFFFFFFF, !0;
};

OPT_MTU {
   option_length dec : 8 : !4;
   mtu_val : 16;
};

OPT_ITS {
   option_length dec : 8 : 5-44;
   its_ptr : 8;
   its_oflw : 4;
   its_flg : 4;
   ITS_CELL_TUPLE[] : (option_length - 4) * 8;
};

ITS_CELL_TUPLE {
   its_cell : 8;
};

OPT_SID {
   option_length dec : 8 : !4;
   sid_id : 16;
};

ICMP_HDR {
   icmp_type : 8;
   icmp_code : 8;
```

A-2

```
  icmp_xsum : 16 : checksum(dod, node, pdu);
  child(icmp_type) : 0 : {
    ICMP_ECHO_REPLY(0),
    ICMP_DESTINATION_UNREACHABLE(3),
    ICMP_SOURCE_QUENCH(4),
    ICMP_REDIRECT(5),
    ICMP_ECHO(8),
    ICMP_TIME_EXCEEDED(0xB),
    ICMP_PARAM_PROBLEM(0xC),
    ICMP_TIMESTAMP(0xD),
    ICMP_TIMESTAMP_REPLY(0xE),
    ICMP_INFO(0xF),
    ICMP_INFO_REPLY(0x10),
    ICMP_ADDRMASK(0x11),
    ICMP_ADDRMASK_REPLY(0x12)
  };
};

ICMP_ECHO_REPLY {   /* ICMP echo reply */
  id : 16 : !1;
  sequence_no : 16 : !1;
};

ICMP_PARAM_PROBLEM {   /* ICMP Param Problem */
  pointer: 8;
  unused: 24;
  internet_hdr : 8;
};

ICMP_REDIRECT {   /* ICMP Redirect */
  gw_ip_address : 32;
  internet_hdr : 8;
};

ICMP_ECHO {   /* ICMP Echo */
  id : 16 : !1;
  sequence_no : 16 : !1;
};

ICMP_TIMESTAMP {   /* ICMP Timestamp */
  id : 16;
  sequence_no : 16;
  originate_time : 32;
  receive_time : 32;
  xmt_time : 32;
};

ICMP_INFO {   /* ICMP Info */
  id : 16;
  sequence_no : 16;
};

ICMP_ADDRMASK {                /* ICMP Address Mask */
  id : 16;
  sequence_no : 16;
  address_mask : 32;
};

#define TCP_HDR_PORTS \
        TCPMUX=1, \
```

A-3

```
ECHO=7, \
DISCARD=9, \
SYSTAT=11, \
DAYTIME=13, \
NETSTAT=15, \
CHARGEN=19, \
FTP_DATA=20, \
FTP=21, \
TELNET=23, \
SMTP=25, \
TIME=37, \
WHOIS=43, \
DNS=53, \
RJE=77, \
FINGER=79, \
LINK=87, \
SUPDUP=95, \
HOSTNAMES=101, \
ISO_TSAP=102, \
X400=103, \
X400_SND=104, \
CSNET_NS=105, \
POP_2=109, \
POP=110, \
SUNRPC=111, \
UUCP_PATH=117, \
NNTP=119, \
NTP=123, \
NEWS=144, \
EXEC=512, \
LOGIN=513, \
SHELL=514, \
PRINTER=515, \
COURIER=530, \
UUCP=540, \
VTALK=562, \
PCSERVER=600, \
NEWPROD=608, \
PSADMIN=964, \
INGRESLOCK=1524, \
IWSERVER=1540, \
SYBASEQUERY=1550, \
SYBASECONSOLE=1551, \
LICENSE=1700, \
TI_EDI_XLTD=1942, \
CAPSERV=2000, \
TI_EDI_CGWD=2030, \
CT=2120, \
LISTEN=2766, \
SAPDP00=3200, \
SAPDP01=3201, \
SAPDP02=3202, \
SAPGW00=3300, \
SAPGW01=3301, \
SAPGW02=3302, \
SAPMSDEV=3600, \
SAPMSTST=3601, \
SAPMSPRD=3602, \
SAPINFDEV=3800, \
SAPINFTST=3801, \
```

A-4

```
        SAPINFPRD=3802, \
        INFMKT=3803, \
        FAX=4557, \
        RWDAEMON=5556, \
        ODB=7001, \
        OVTOPMD=8888, \
        OVWDB=9999, \
        NETPERF=1286 define TCP_SD(port) ((src_port == port) || (dst_port == port))

TCP_HDR {
  src_port : 16: TCP_HDR_PORTS;
  dst_port : 16: TCP_HDR_PORTS;

seq : 32;                    /* Sequence Number */
  ack_seq : 32;                /* Acknowledgement */
  hlen : 4;                    /* 4-bit header length field */
  rsvd : 6;                    /* reserved bits */
  /* Bits of the CODE field in the TCP header to determine the purpose */
  /* and contents of the segment, from left to right, are:              */
  /*    | URG | ACK | PSH | RST | SYN | FIN |                           */
  ctrl : 6 : FIN = 1, SYN = 2, RESET = 4, PUSH = 8,
        ACK = 16, FINACK = 17, SYNACK = 18, PUSHACK = 24, URG = 32;
  window : 16;                 /* The Window advertisement */
  xsum : 16 : checksum(tcp, IP_HDR, IP_HDR); /* checksum */
  urg_ptr : 16;                /* Urgent pointer */
  child(src_port) : 0 : {
    TCPMUX_HDR(TCP_SD(1)),
    ECHO_HDR(TCP_SD(7)),
    DISCARD_HDR(TCP_SD(9)),
    SYSTAT_HDR(TCP_SD(11)),
    DAYTIME_HDR(TCP_SD(13)),
    NETSTAT_HDR(TCP_SD(15)),
    CHARGEN_HDR(TCP_SD(19)),
    FTP_DATA_HDR(TCP_SD(20)),
    FTP_HDR(TCP_SD(21)),
    TELNET_HDR(TCP_SD(23)),
    SMTP_HDR(TCP_SD(25)),
    TIME_HDR(TCP_SD(37)),
    WHOIS_HDR(TCP_SD(43)),
    DNS_HDR(TCP_SD(53)),
    RJE_HDR(TCP_SD(77)),
    FINGER_HDR(TCP_SD(79)),
    LINK_HDR(TCP_SD(87)),
    SUPDUP_HDR(TCP_SD(95)),
    HOSTNAMES_HDR(TCP_SD(101)),
    ISO_TSAP_HDR(TCP_SD(102)),
    X400_HDR(TCP_SD(103)),
    X400_SND_HDR(TCP_SD(104)),
    CSNET_NS_HDR(TCP_SD(105)),
    POP_2_HDR(TCP_SD(109)),
    POP_HDR(TCP_SD(110)),
    SUNRPC_HDR(TCP_SD(111)),
    UUCP_PATH_HDR(TCP_SD(117)),
    NNTP_HDR(TCP_SD(119)),
    NTP_HDR(TCP_SD(123)),
    NEWS_HDR(TCP_SD(144)),
    EXEC_HDR(TCP_SD(512)),
    LOGIN_HDR(TCP_SD(513)),
```

```
        SHELL_HDR(TCP_SD(514)),
        PRINTER_HDR(TCP_SD(515)),
        COURIER_HDR(TCP_SD(530)),
        UUCP_HDR(TCP_SD(540)),
        VTALK_HDR(TCP_SD(562)),
        PCSERVER_HDR(TCP_SD(600)),
        NEWPROD_HDR(TCP_SD(608)),
        PSADMIN_HDR(TCP_SD(964)),
        INGRESLOCK_HDR(TCP_SD(1524)),
        IWSERVER_HDR(TCP_SD(1540)),
        SYBASEQUERY_HDR(TCP_SD(1550)),
        SYBASECONSOLE_HDR(TCP_SD(1551)),
        LICENSE_HDR(TCP_SD(1700)),
        TI_EDI_XLTD_HDR(TCP_SD(1942)),
        CAPSERV_HDR(TCP_SD(2000)),
        TI_EDI_CGWD_HDR(TCP_SD(2030)),
        CT_HDR(TCP_SD(2120)),
        LISTEN_HDR(TCP_SD(2766)),
        SAPDP00_HDR(TCP_SD(3200)),
        SAPDP01_HDR(TCP_SD(3201)),
        SAPDP02_HDR(TCP_SD(3202)),
        SAPGW00_HDR(TCP_SD(3300)),
        SAPGW01_HDR(TCP_SD(3301)),
        SAPGW02_HDR(TCP_SD(3302)),
        SAPMSDEV_HDR(TCP_SD(3600)),
        SAPMSTST_HDR(TCP_SD(3601)),
        SAPMSPRD_HDR(TCP_SD(3602)),
        SAPINFDEV_HDR(TCP_SD(3800)),
        SAPINFTST_HDR(TCP_SD(3801)),
        SAPINFPRD_HDR(TCP_SD(3802)),
        INFMKT_HDR(TCP_SD(3803)),
        FAX_HDR(TCP_SD(4557)),
        RWDAEMON_HDR(TCP_SD(5556)),
        ODB_HDR(TCP_SD(7001)),
        OVTOPMD_HDR(TCP_SD(8888)),
        OVWDB_HDR(TCP_SD(9999)),
        NETPERF_HDR(TCP_SD(12865))
    };
};

#define UDP_HDR_PORTS \
        ECHO=7, \
        DISCARD=9, \
        DAYTIME=13, \
        CHARGEN=19, \
        TIME=37, \
        NAME=42, \
        DNS=53, \
        BOOTP=67, \
        BOOTP=68, \
        TFTP=69, \
        SUNRPC=111, \
        ERPC=121, \
        NTP=123, \
        NETBIOS_NAME_SERVICE=137, \
        SNMP=161, \
        SNMP_TRAP=162, \
        XDM=177, \
        ALBD=371, \
        EDDP=387, \
```

A-6

```
        BIFF=512, \
        WHO=513, \
        SYSLOG=514, \
        TALK=517, \
        RIP=520, \
        NEW_RWHO=550, \
        RMONITOR=560, \
        MONITOR=561, \
        SECURID=755, \
        PSADMIND=964, \
        WSNOTIFY=2001, \
        NETTIME=2002, \
        CDXLOCK=2011, \
        ZEPHYR_CTL=2103, \
        ZEPHYR_HM=2104, \
        PUBLIC=700 define UDP_SD(port) ((udp_src_port == port) || (udp_dest_port == port))

UDP_HDR {
  udp_src_port : 16 : UDP_HDR_PORTS;
  udp_dest_port : 16 : UDP_HDR_PORTS;
  udp_length dec : 16 : length(nil, node, pdu);
  udp_xsum : 16 ;/* checksum(udp, IP_HDR, IP_HDR);*/
  child(udp_src_port) : 0 : {
    ECHO_HDR(UDP_SD(7)),
    DISCARD_HDR(UDP_SD(9)),
    DAYTIME_HDR(UDP_SD(13)),
    CHARGEN_HDR(UDP_SD(19)),
    TIME_HDR(UDP_SD(37)),
    NAME_HDR(UDP_SD(42)),
    DNS_HDR(UDP_SD(53)),
    BOOTP_HDR(UDP_SD(67)),
    BOOTP_HDR(UDP_SD(68)),
    TFTP_HDR(UDP_SD(69)),
    SUNRPC_HDR(UDP_SD(111)),
    ERPC_HDR(UDP_SD(121)),
    NTP_HDR(UDP_SD(123)),
    NETBIOS_NAME_SERVICE_HDR(UDP_SD(137)),
    SNMP_HDR(UDP_SD(161)),
    SNMP_TRAP_HDR(UDP_SD(162)),
    XDM_HDR(UDP_SD(177)),
    ALBD_HDR(UDP_SD(371)),
    EDDP_HDR(UDP_SD(387)),
    BIFF_HDR(UDP_SD(512)),
    WHO_HDR(UDP_SD(513)),
    SYSLOG_HDR(UDP_SD(514)),
    TALK_HDR(UDP_SD(517)),
    RIP_HDR(UDP_SD(520)),
    NEW_RWHO_HDR(UDP_SD(550)),
    RMONITOR_HDR(UDP_SD(560)),
    MONITOR_HDR(UDP_SD(561)),
    SECURID_HDR(UDP_SD(755)),
    PSADMIND_HDR(UDP_SD(964)),
    WSNOTIFY_HDR(UDP_SD(2001)),
    NETTIME_HDR(UDP_SD(2002)),
    CDXLOCK_HDR(UDP_SD(2011)),
    ZEPHYR_CTL_HDR(UDP_SD(2103)),
    ZEPHYR_HM_HDR(UDP_SD(2104)),
    PUBLIC_HDR(UDP_SD(7000))
```

A-7

```
  };
};
NBNS_TUPLE {
  nbnst_length : 8;
  nbnst_name_str : nbnst_length * 8;
};
NETBIOS_NAME_SERVICE_HDR {
  nbns_name_trn_id : 16 ;
  nbns_req_or_resp : 1  : REQ = 0, RESP = 1;
  nbns_opcode      : 4  : !QUERY = 0, REGISTRATION = 5, RELEASE = 6, WACK = 7,
                          REFRESH = 8;
  nbns_auth_answer : 1  ;
  nbns_truncation  : 1  ;
  nbns_recur_des   : 1  ;
  nbns_recur_avail : 1  ;
  nbns_unused      : 2  ;
  nbns_broadcast   : 1  ;
  nbns_rcode       : 4  ;
  nbns_qdcount     : 16 ;
  nbns_ancount     : 16 ;
  nbns_nscount     : 16 ;
  nbns_arcount     : 16 ;
  NBNS_TUPLE[NBNS_TUPLE.nbnst_length == 0] : 0;
  nbns_q_type      : 16 : !0x20;
  nbns_q_class     : 16 : !1;
  child(nbns_req_or_resp) : 0 : {
        ANSWER_HDR(1)
  };
};

ANSWER_HDR {
  ttl              : 32 ;
  rdlength         : 16 : !6;
  flags            : 16 : !0;
  ip_address ip    : 32 : 1-0xffffffff;
};
RIP_HDR {
  rip_cmd : 8 : RIP_REQUEST = 1, RIP_RESPONSE = 2;
  rip_ver : 8 : !1;
  rip_unused1 : 16;
  RIP_INFO[] : (UDP_HDR.udp_length - 12) * 8;
};
RIP_INFO {
  rip_family : 16 : IP_RIP_AF_INET = 2;
  rip_port : 16;
  rip_address : 32;
  rip_router : 32;
  rip_unused2 : 32;
  rip_metric : 32;
};
```

```
#include "tags.pdh"

#define HBCAST BROADCAST=0xffffffffffff
define NLOCAL LOCAL=0x00000000 define IPX_TYPES \
        UNKNOWN=0, \
        RIP=1, \
        ECHO=2, \
        ERROR=3, \
        SAP=4, \
        SPX=5, \
        NCP=0x11, \
        NETBIOS=0x14 define IPX_SOCK_TYPES \
        NCP=0x0451, \
        SAP=0x0452, \
        RIP=0x0453, \
        NETBIOS=0x0455, \
        DIAG=0x0456, \
        SERIALIZATION=0x0457, \
        NLSP=0x9001, \
        IPXWAN=0x9004

IPX_HDR {
  idp_xsum  : 16 : legal_values=(NONE=0xffff), default=0xffff,
                        display="Checksum";
  idp_len   : 16 : legal_values=(30-0xffff), send = length(node, pdu),
                        display="Length";
  hops      : 8  : legal_values=(0-0x0f), default=0,
                        display="Hops Traversed";
  type      : 8  : legal_values=(IPX_TYPES),
                        display="Packet Type";

dna_net   : 32 : legal_values=(NLOCAL), default=0,
                        display="Destination Network";
  dna_node  : 48 : legal_values=(HBCAST), default=0xffffffffffff,
                        display="Destination Host",
                        tags=(DST_ADDRESS);
  dna_sock  : 16 : legal_values=(IPX_SOCK_TYPES), default=0x4001,
                        display="Destination Socket";

sna_net   : 32 : legal_values=(NLOCAL), default=0x00000000,
                        display="Source Network";
  sna_node  : 48 : legal_values=(HBCAST), default=0x554433221100000,
                        display="Source Host", tags=(SRC_ADDRESS);
  sna_sock  : 16 : legal_values=(IPX_SOCK_TYPES), default=0x4002,
                        display="Source Socket";

child(dna_sock) : (idp_len - 30) * 8 : {
        IPX_NETBIOS_HDR(type == 0x14),
        IPX_SAP_HDR(0x0452),
        IPX_RIP_HDR(0x0453),
        IPX_DIAG_REQ_HDR(0x0456),
        IPX_DIAG_RES_HDR(sna_sock == 0x0456),
        IPX_SER_PKT(0x0457),
        IPX_NLSP_HDR(0x9001),
        IPX_IPXWAN_HDR(0x9004),
```

```
        IPX_SAP_HDR(sna_sock == 0x0452),
        IPX_RIP_HDR(sna_sock == 0x0453),
        IPX_NCP_HDR((dna_sock == 0x0451) || (sna_sock == 0x0451)),
        IPX_DYNAMIC((dna_sock > 0x3fff) && (dna_sock < 0x8000) &&
                    (sna_sock > 0x3fff) && (sna_sock < 0x8000))
    };
} display="IPX Header", tags=(NETWORK_LAYER);

/* IPX RIP Header */
IPX_RIP_HDR {
    rip_op   : 16 : legal_values=(RIPQ=1, RIPR=2), default=1,
                    display="Routing Operation %dec";
    IPX_RIP_TUPLE[] : (IPX_HDR.idp_len - 32) * 8;
} display="IPX RIP Header";

/* IPX RIP Entry */
IPX_RIP_TUPLE {
    net    : 32 : legal_values=(EVERYTHING=0xffffffff),
                    display="Network";
    hops   : 16 : legal_values=(0-0x0f, NET_DEAD=0x10), default=1,
                    display="Hops";
    ticks  : 16 : legal_values=(0-0xffff), default=2,
                    display="Ticks";
} display="IPX RIP Entry %dec";

#define IPX_SAP_TYPES \
        FileSrvr=0x0004, \
        JobSrvr=0x0005, \
        PrntSrvr=0x0007, \
        ArchSrvr=0x0009, \
        JobQueue=0x000a, \
        NASSNAGate=0x0021, \
        TimeSyncVAP=0x002d, \
        DynamicSAP=0x002e, \
        AdvPrtSrvr=0x0047, \
        BtrieveVAP50=0x004b, \
        SQLVAP=0x004c, \
        TESNetWareVMS=0x007a, \
        NetWareAccessSrvr=0x0098, \
        NamedPipesSrvr=0x009a, \
        PortNetWareUNIX=0x009e, \
        NetWare386=0x0107, \
        TestServer=0x0111, \
        NetWareMangmnt=0x0166, \
        NetWareMangmnt=0x026a /* IPX SAP Header */
IPX_SAP_HDR {
    sap_op   : 16 : legal_values=(SAPGSQ=1, SAPGSR=2, SAPNSQ=3, SAPNSR=4),
                    display="Service Operation";
    child(sap_op) : 0 : {
        IPX_SAP_GQUERY(1),
        IPX_SAP_GRESP(2),
        IPX_SAP_NQUERY(3),
        IPX_SAP_NRESP(4)
    };
} display="IPX SAP Header";

IPX_SAP_GQUERY {
```

```
    stype  : 16 : legal_values=(IPX_SAP_TYPES, EVERYTHING=0xffff),
                    default=0xffff, display="Service Type";
} display="IPX SAP General Server Query";

IPX_SAP_NQUERY {
    stype : 16 : legal_values=(IPX_SAP_TYPES, EVERYTHING=0xffff),
                    default=0xffff, display="Service Type";
} display="IPX SAP Nearest Server Query";

IPX_SAP_GRESP {
    IPX_SAP_TUPLE[] : pdu - node;
} display="IPX SAP General Server Response";

IPX_SAP_NRESP {
    IPX_SAP_TUPLE[] : pdu - node;
} display="IPX SAP Nearest Server Response";

/* IPX SAP Entry */
IPX_SAP_TUPLE {
    stype    : 16  : legal_values=(IPX_SAP_TYPES, EVERYTHING=0xffff),
                       default=0x0004, display="Type";
    sname    : 376 : default="abcde", display="Name %str";
    snameend : 8   : default=0;
    snet     : 32  : default=IPX_HDR.sna_net, display="Network";
    snode    : 48  : default=IPX_HDR.sna_node, display="Node";
    ssock    : 16  : default=IPX_HDR.sna_sock, display="Socket";
    shops    : 16  : legal_values=(SERV_DEAD=0x10), default=IPX_HDR.hops,
                       display="Hops %hex hops";
} display="IPX SAP Entry %dec";

IPX_DIAG_REQ_HDR {
    exclusion_addr_count : 8 : default=0, /* number of addresses to exclude */
                                 display="Exclusion Count";
    IPX_DIAG_ADDR[]      : (exclusion_addr_count * 8 * 6);
} display="IPX Diagnostic Request Header";

IPX_DIAG_ADDR {
    address : 48 : display="Address";    /* address to exclude */
} display="IPX Diagnostic Address %dec";

IPX_DIAG_RES_HDR {
    major_version    : 8  : display="Major Version %dec";
    minor_version    : 8  : display="Minor Version %dec";
    diagnostic_socket : 16 : display="Diagnostic Socket";
    component_count  : 8  : display="Component Count";
    DIAG_RES_COMPONENT[component_count] : 0;
} display="IPX Diagnostic Response Header";

DIAG_RES_COMPONENT {
    type : 8 : legal_values=(IPX_SPX=0, ROUTER_DRV=1, LAN_DRV=2, SHELLS=3, VAPS=4,
              ROUTER=5, FILESERVER_ROUTER=6, NONDED_IPX_SPX=7),      /* Ext */
              display="Type";
    child(type) : 0 : {
      DIAG_COMP_ROUTER(5),
      DIAG_COMP_FILESERVER_ROUTER(6),
      DIAG_COMP_NONDED_IPX_SPX(7)
    };
} display="IPX Diagnostic Response Component";

DIAG_COMP_ROUTER {
```

A-11

```
};

DIAG_COMP_FILESERVER_ROUTER {
  network_count : 8 : display="Network Count";
};

DIAG_COMP_NONDED_IPX_SPX {
};

IPX_SER_PKT {
    serial_number : 48 : default=0, display="Serial Number"; /* serial number */
} display="IPX Serialization Packet";

IPX_DYNAMIC {
    connection_number : 8 : display="Connection Number";
    signature_char    : 8 : legal_values=(WATCHDOG_POLL=0x3f, WATCHDOG_OK=0x59),
                            display="Signature Character";
} display="IPX Dynamic Socket";

IPX_NETBIOS_HDR {
    IPX_NETBIOS_TRACE[8] : 0;
    something            : 16 : display="What is this?";
    netbiosname          : 16 * 8 : default="ABCDEFGHIJKLMNOP",
                                  display="NetBIOS Name %str";
} display="IPX NetBIOS Header";

IPX_NETBIOS_TRACE {
    nettrace : 32 : default=0, display="Network";
} display="IPX NetBIOS Trace %dec";

IPX_IPXWAN_HDR {
    widentifier  : 32 : legal_values=(WASM=0x5741534d), default=0x5741534d;
    wpackettype  : 8  : legal_values=(TIMERREQ=0x00,
                        TIMERRES=0x01,
                        INFOREQ=0x02,
                        INFORES=0x03,
                        THROUGHREQ=0x04,
                        THROUGHRES=0x05,
                        DELAYREQ=0x06,
                        DELAYRES=0x07,
                        NAK=0xff), default=0x00;
    wnodeid      : 32 : default=0;
    wsequencenum : 8  : default=0;
    wnumoptions  : 8;
    IPX_IPXWAN_OPTION[wnumoptions] : 0;
} display="IPXWAN Header";

IPX_IPXWAN_OPTION {
    woptionnumber : 8  : legal_values=(ROUTING=0x00,
                        INFO=0x01,
                        NLSP_INFO=0x02,
                        NLSP_RAW_THROUGH=0x03,
                        EXTENDED=0x04,
                        NIC=0x05,
                        COMPRESS=0x80,
                        PAD=0xff), default=0x00;
    wacceptoption : 8  : legal_values=(NO=0, YES=1, NA=3), default=1;
    woptiondatalen: 16;
    child (woptionnumber) : woptiondatalen : {
      IPXWAN_ROUTING_TYPE(0x00),
```

A-12

```
    IPXWAN_INFO_TYPE(0x01),
    IPXWAN_NLSP_INFO_TYPE(0x02),
    IPXWAN_NLSP_RAW_THROUGH_TYPE(0x03),
    IPXWAN_EXTENDED_TYPE(0x04),
    IPXWAN_NIC_TYPE(0x05),
    IPXWAN_COMPRESS_TYPE(0x80),
    IPXWAN_PAD_TYPE(0xff)
  );
} display="IPXWAN Option %dec";

IPXWAN_ROUTING_TYPE {
  type : 8 : legal_values=(RIP_SAP=0x00,
            NLSP=0x01,
            UNNUM=0x02,
            ONDEMAND=0x03,
            CLIENT=0x04), default=0;
} display="IPXWAN Routing Type";

IPXWAN_INFO_TYPE {
  linkdelay  : 16;
  commonnet  : 32 : legal_values=(NONE=0x00000000), default=0;
  routername : 48 * 8 : default="IpxwanRouter", display="%str";
} display="IPXWAN Information Type";

IPXWAN_NLSP_INFO_TYPE {
  delay      : 32;
  throughput : 32;
} display="IPXWAN NLSP Information Type";

IPXWAN_NLSP_RAW_THROUGH_TYPE {
  requestsize : 32;
  deltatime   : 32;
} display="IPXWAN NLSP RawThroughput Type";

IPXWAN_EXTENDED_TYPE {
  primarynet : 32 : default=1;
} display="IPXWAN Extended Type";

IPXWAN_NIC_TYPE {
  nicaddress : 6 * 8 : default=0x020102030405;
} display="IPXWAN Nic Type";

IPXWAN_COMPRESS_TYPE {
  compresstype    : 8 : legal_values=(TELEBIT=0x00), default=0;
  compressoptions : 8 : default=1;
  compressslots   : 8 : default=0x10;
} display="IPXWAN Compression Type";

IPXWAN_PAD_TYPE {
} display="IPXWAN Padding";

/* IPX NCP Header */
IPX_NCP_HDR {
  type : 16 : legal_values=(Create_Service_Connection=0x1111,  /* Request Type
            Service_Request=0x2222,                /* Request Type */
            Service_Reply=0x3333,                  /* Reply   Type */
            Destroy_Service_Connection=0x5555,     /* Request Type */
            Burst_Mode_Transfer=0x7777,            /* Both         */
            Request_Being_Processed=0x9999),       /* Reply   Type */
```

A-13

```
                    default=0x1111;
    child (type) : 0 : {
      NCP_REQUEST_TYPE((type == 0x1111) || (type == 0x2222) || (type == 0x5555)),
      NCP_REPLY_TYPE((type == 0x3333) || (type == 0x9999)),
      NCP_BURST_TYPE(0x7777)
    };
} display="IPX NCP (Netware Core Protocol) Header";

/* NCP Request */
NCP_REQUEST_TYPE {
    sequence_number   : 8;
    conn_number_low   : 8;
    task_number       : 8;
    conn_number_high  : 8: default=0;
    function_code     : 8: display="%dec";
    child (function_code) : 0 : {
      NCP_SUBFUNCTION((function_code == 17) || (function_code == 21) ||
                     (function_code == 22) || (function_code == 23) ||
                     (function_code == 32) || (function_code == 34))
    };
} display="IPX NCP Request Type";

NCP_SUBFUNCTION {
    subfunction_width : 16;
    subfunction_code  : 8 : display="%dec";
} display="IPX NCP Subfunction Type";

/* NCP Reply */
NCP_REPLY_TYPE {
    sequence_number   : 8;
    conn_number_low   : 8;
    task_number       : 8;
    conn_number_high  : 8 : default=0;
    completion_code   : 8 : legal_values=(SUCCESSFUL=0), default=0;
    conn_status       : 8 : legal_values=(UP=0, DOWN=1), default=0;
} display="IPX NCP Reply Type";

NCP_BURST_TYPE {
    flags             : 8; /* SYS SAK EOB BSY ABT */
    stream_type       : 8 : legal_values=(BIG_BURST_SEND=0x02), default=0x02;
    source_conn_id    : 32;
    dest_conn_id      : 32;
    packet_sequence   : 32;
    send_delay_time   : 32;
    burst_seq_number  : 16;
    ack_seq_nubmer    : 16;
    total_burst_len   : 32;
    burst_offset      : 32;
    burst_length      : 16;
    frag_list_ent     : 16;
    function          : 32;
    file_handle       : 32;
    starting_offset   : 32;
    bytes_to_write    : 32;
} display="IPX NCP Burst Type";
```

A-14

Appendix B. Grammar

NAME: [a-zA-Z_][a-zA-Z_0-9]*

HEX: 0x[a-f0-9]+

NUMBER: [0-9]+

```
pdf_list:
         pdf ';'
         pound_directive
         pdf_list pound_directive
         pdf_list pdf ';'
         ;

pdf:
         NAME '{' field_list '}' node_attr_list
         NAME '{' field_list '}'
         NAME '{' '}' node_attr_list
         NAME '{' '}'
         ;

node_attr_list:  node_attr_expr | node_attr_list ','
node_attr_expr;

node_attr_expr:
         NAME '=' NAME
         NAME '=' NUMBER
         NAME '=' STRING
         NAME '=' '(' STRING ')'
         NAME '=' '(' NAME ')'
         ;

field_list: field_expr ';' | field_list field_expr ';';

field_expr:
         NAME ':' width_expr
         NAME ':' width_expr ':' fld_attr_list
         NAME '[' array_expr ']' ':' width_expr
         NAME '(' NAME ')' ':' width_expr ':' '{' child_list
'}'
         ;

operator: AND | OR | EQU | NEQ | '<' | '>' | '&' | '|' | '+'
 | '-' | '*' | '/' | array_expr: NAME | NUMBER | NAME operator NUMBER | ;

width_expr:
         '!' width_expr
         width_expr operator width_expr
         '(' width_expr ')'
         NUMBER
```

B-1

```
          NAME
          NAME '(' arg_list ')'
          ;

arg_list:  arg_expr | arg_list ',' arg_expr;

arg_expr:  NAME | NUMBER | HEX | ;

fld_attr_list:  fld_attr_expr | fld_attr_list ','
fld_attr_expr;

fld_attr_expr:
          DEFAULT '=' width_expr
          LEGAL_VALUES '=' '(' val_list ')'
          DISPLAY '=' STRING
          TAGS '=' '(' val_simple_list ')'
          ;

val_list:
          val_range_sym
          val_range
          val_expr
          val_list ',' val_range_sym
          val_list ',' val_range
          val_list ',' val_expr
          ;

val_simple_list:  val_simple | val_simple_list ','
val_simple;

val_range_sym:  NAME '=' NUMBER '-' NUMBER;

val_range:  NUMBER '-' NUMBER;

val_expr:  NAME '=' NUMBER | NAME '=' HEX | val_simple;

val_simple:  NUMBER | HEX | STRING | NAME;

child_list:  child | child_list ',' child;

child:
          NAME '(' child_demux_elem ')'
          NAME '(' child_demux_elem ',' NUMBER ')'
          NAME '(' child_demux_elem ',' '-' NUMBER ')'
          ;

child_demux_elem:  width_expr | DEFAULT;

pound_directive:
          POUND_DIRECTIVE NUMBER STRING NUMBER
          POUND_DIRECTIVE NUMBER STRING
          ;
```

B-2

What is claimed is:

1. An apparatus for generating data packets comprising:

a memory device containing a packet definition file for storing a description of a packet data format described in accordance with a packet description language for describing packet data formats wherein said packet description language is a declaritive language describing sequences of bits with both fixed and variable length fields;

a packet description compiler coupled to receive said description of a packet data format, said packet description compiler for converting said description of a packet data, format to a packet definition data structure; and a packet processor coupled to reference said packet definition data structure and to receive packet content information, said packet processor generating a data packet incorporating said packet content information in a data packet format defined by said description of a packet data format.

2. The apparatus of claim 1 wherein said packet description language further includes syntax for encoding semantics of packet data including intra-packet relationships between fields.

3. The apparatus of claim 2 wherein said packet processor further comprises a user interface coupled to receive information for inclusion in generating said data packet.

4. An apparatus for decoding data packets comprising:

a memory device containing a packet definition file for storing a description of a packet data format described in accordance with a packet description language for describing packet data formats wherein said packet description language is a declarative language describing sequences of bits with both fixed and variable length fields;

a packet description compiler coupled to receive said description of a packet data format, said packet description compiler for converting said description of a packet data format to a packet definition data structure; and a packet processor coupled to reference said packet definition data structure and to receive an incoming data packet, said packet processor decoding said incoming data packet in accordance with said description of a packet data format stored in said packet definition file.

5. The apparatus of claim 4 wherein said packet description language further includes syntax for encoding semantics of packet data including intra-packet relationships between fields.

6. The apparatus of claim 5 wherein said packet description language provides a syntax for defining field attributes including display formats for fields.

7. The apparatus of claim 6 further comprising an output device coupled to said packet processor for displaying a decoded incoming data packet in accordance with said display formats.

8. A method of generating a data packet:

defining a packet data format in a packet description language for describing packet data for mats wherein said packet description language is a declarative language describing sequences of bits with both fixed and variable length fields;

storing said packet data format in a packet description file;

compiling said packet description file to generate a packet description data structure;

specifying content information for a data packet; and assembling a data packet incorporating said content information in a packet format specified in said packet description file with reference to said packet description data structure.

9. The method of claim 8 wherein said packet description language further includes syntax for encoding semantics of packet data including intra-packet relationships between fields.

10. The method of claim 9 further comprising the step of propagating said data packet to a destination address identified by said data packet content information.

11. A method of decoding a data packet:

defining a packet data format in a packet description language for describing packet data formats wherein said packet description language is a declarative language describing sequences of bits with both fixed and variable length fields;

storing said packet data format in a packet description file;

compiling said packet description file to generate a packet description data structure;

receiving an incoming data packet; and disassembling said incoming data packet by reference to said packet description data structure.

12. The method of claim 11 wherein said packet description language further includes syntax for encoding semantics of packet data including intra-packet relationships between fields.

13. The method of claim 12 wherein said packet description language provides a syntax for defining field attributes including display formats for fields.

14. The method of claim 13 further comprising the step of displaying information from a disassembled data packet according to said display format attributes.

* * * * *